United States Patent
Stephens

(10) Patent No.: US 8,375,161 B2
(45) Date of Patent: Feb. 12, 2013

(54) FLASH MEMORY HASH TABLE

(76) Inventor: James H. Stephens, Austin, TX (US)

( * ) Notice: Subject to any disclaimer, the term of this patent is extended or adjusted under 35 U.S.C. 154(b) by 315 days.

(21) Appl. No.: 12/717,034

(22) Filed: Mar. 3, 2010

(65) Prior Publication Data

US 2011/0219168 A1 Sep. 8, 2011

(51) Int. Cl.
*G06F 12/00* (2006.01)
*G06F 13/00* (2006.01)

(52) U.S. Cl. ........ 711/103; 711/100; 711/101; 711/154; 711/170; 711/171; 711/216; 711/E12.084

(58) Field of Classification Search ............... 711/103, 711/100, 101, 154, 170, 171, 216, E12.084
See application file for complete search history.

(56) References Cited

U.S. PATENT DOCUMENTS

| | | | |
|---|---|---|---|
| 5,388,266 | A | 2/1995 | Frey et al. |
| 7,058,639 | B1 | 6/2006 | Chatterjee et al. |
| 7,447,870 | B2 | 11/2008 | Hsieh et al. |
| 7,461,233 | B2 | 12/2008 | Hsieh et al. |
| 2007/0028033 | A1 | 2/2007 | Hsieh et al. |
| 2008/0109590 | A1 | 5/2008 | Jung et al. |
| 2009/0106486 | A1 | 4/2009 | Kim et al. |

OTHER PUBLICATIONS

United States Patent and Trademark Office, International Search Report and Written Opinion of the International Searching Authority for PCT/US11/23238, prepared on Aug. 17, 2011 and mailed on Aug. 26, 2011, United States.
Chung, Tae-Sun, et al, A survey of Flash Translation Layer, Journal of Systems Architecture, May 2009, 332-343, 55(5-6), Elsevier North-Holland, Inc, New York, U.S.A. (accessed via http://kde.hanyang.ac.kr/papers/AsurveyFlash-JSA.pdf on Feb. 9, 2010).
Tsai, Yi-Lin, et al, Configurable NAND Flash Translation Layer, Proceedings of the IEEE International Conference on Sensor Networks, Ubiquitous, and Trustworthy Computing (SUTC'06), Jun. 2006, 118-127, vol. 1, Taichung, Taiwan.
Wu, C., et al., An efficient R-tree implementation over flash-memory storage systems, Proceedings of the 11th ACM International Symposium on Advances in Geographic Information Systems, Geographic Information Systems, 2003, 17-24, ACM, New York, U.S.A.
Wu, C., et al., An efficient B-tree layer implementation for flash-memory storage systems, ACM Transactions on Embedded Computing Systems, Jul. 2007, 1-23, 6(3), Article 19, ACM, New York, U.S.A.
Spiewak, D., "More Persistent Vectors: Performance Analysis," Sep. 1, 2008, accessed at http://www.codecommit.com/blog/scala/more-persistent-vectors-performance-analysis , accessed on Mar. 9, 2012, pp. 4.

*Primary Examiner* — Midys Rojas

(57) ABSTRACT

Implementations and techniques for flash memory-type hash tables are generally disclosed.

21 Claims, 8 Drawing Sheets

700 A computer program product.

702 A signal bearing medium.

704 at least one of
machine-readable instructions, which, if executed by one or more processors, operatively enable a computing device to:

determine an input key hash value by hashing the input key of an input key/value pair, wherein the input key/value pair includes an input key and an input value;

identify a write erase unit based at least in part on the determined input key hash value;

designate one or more entries in the write erase unit with an obsolete value when stored key/value pairs in the entries include a stored key that corresponds to the input key and includes a stored value that does not correspond to the input value; and/or compact the write erase unit when the identified write erase unit to be written to is determined to be full, wherein the compaction of the write erase unit is based at least in part on the designated obsolete value.

| 706 a computer-readable medium. | 708 a recordable medium. | 710 a communications medium. |

FIG. 7

FLASH MEMORY HASH TABLE

BACKGROUND

Unless otherwise indicated herein, the approaches described in this section are not prior art to the claims in this application and are not admitted to be prior art by inclusion in this section.

Flash memory behaves differently from traditional spinning media, which has formed a foundation for search/indexing software for the last fifty years, and the abstraction of the flash translation layer (FTL) hides many of these differences.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 7 is an illustration of an example computer program product; and

DETAILED DESCRIPTION

Figure 1:
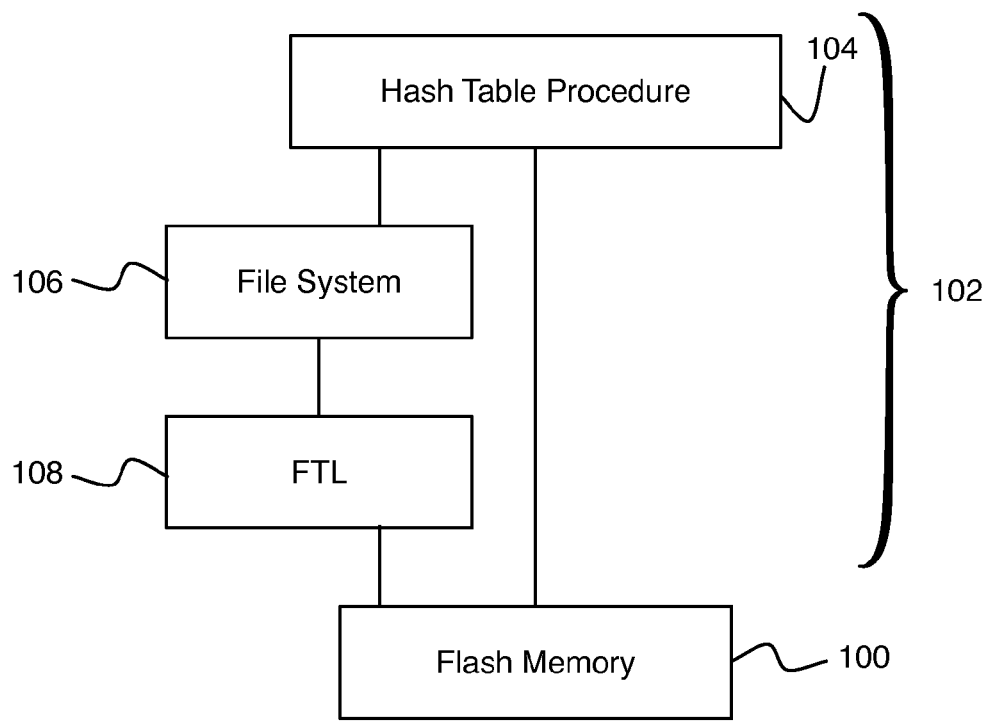
FIG. 1 is an illustration of an example flash memory that includes a flash memory application program interface configured to implement hash table procedures.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and systems related to implementing flash memory-type hash tables.

Flash memory may behave differently from spinning media, which has formed a foundation for search/indexing software for the last fifty years, and the abstraction of flash translation layer (FTL) hides many of these differences. However, not all of the FTL and/or file system interaction with flash memory may be necessary or even helpful when interacting with flash memory through hash table procedures. Such hash table procedures may use low-level functionality to achieve high-level management of flash memory, which would otherwise be obscured by mid-level programming interfaces (e.g. FTL and/or a file system).

FIG. 1 is an illustration of an example flash memory 100 that includes a flash memory application program interface 102 configured to implement hash table procedure 104 that is arranged in accordance with at least some embodiments of the present disclosure. The flash memory application program interface 102 may include an interface to flash memory 100 comprising the following: an erase operation, a write operation, and a read operation for erase units (or constituent subunits or the like).

As used herein the term "flash memory" may refer to any number of non-volatile memories that may be accessed for read, write or erase operations that have data transfers comprising units in larger than bit form. For example, flash memory may include memory with the following functionality: 1) the ability to erase from memory on an erase unit basis, 2) the ability to write to memory on a byte, word, or block basis, 3) the ability to read from memory on a byte, word, or block basis or the like. As used herein the term "erase unit" may refer to a block of memory including a plurality of byte-sized entries in a flash memory. Further, examples below that discuss operation with respect to "erase units" may additionally or alternatively apply to constituent subunits or the like. As used herein the term "byte-sized entry" and/or "byte entry" may refer a multi-bit portion of memory that is smaller than an erase unit. For example, a byte-sized entry or byte entry may be a multi-bit portion of memory that is identifiable with 2 bits, 8 bits, 9 bits, or the like, and accordingly, the claimed subject matter is not to be limited in these respects.

Hash table procedure 104 may be tuned for flash memory 100 to bypass a file system 106 (if any) and/or bypass a flash translation layer (FTL) 108 to improve performance. In particular, hash table procedure 104 may provide for wear leveling as a byproduct without implementing wear leveling by the FTL 108. Further, hash table procedure 104 may not require logical block management to interact with flash memory 100. Hash table procedures 104 may improve flash memory 100 performance by bypassing unnecessary or unhelpful portions of file system 106 and/or FTL 108. For example, logical block management and/or wear leveling, which may be provided by some FTL's, may be bypassed, reduced, and/or eliminated by hash table procedure 104. For example, a type of wear leveling via hash table procedure 104 may be utilized instead of or in addition to wear leveling by FTL 108. Additional wear leveling by FTL 108 may reduce performance and could even be counterproductive in certain circumstances.

Figure 2:
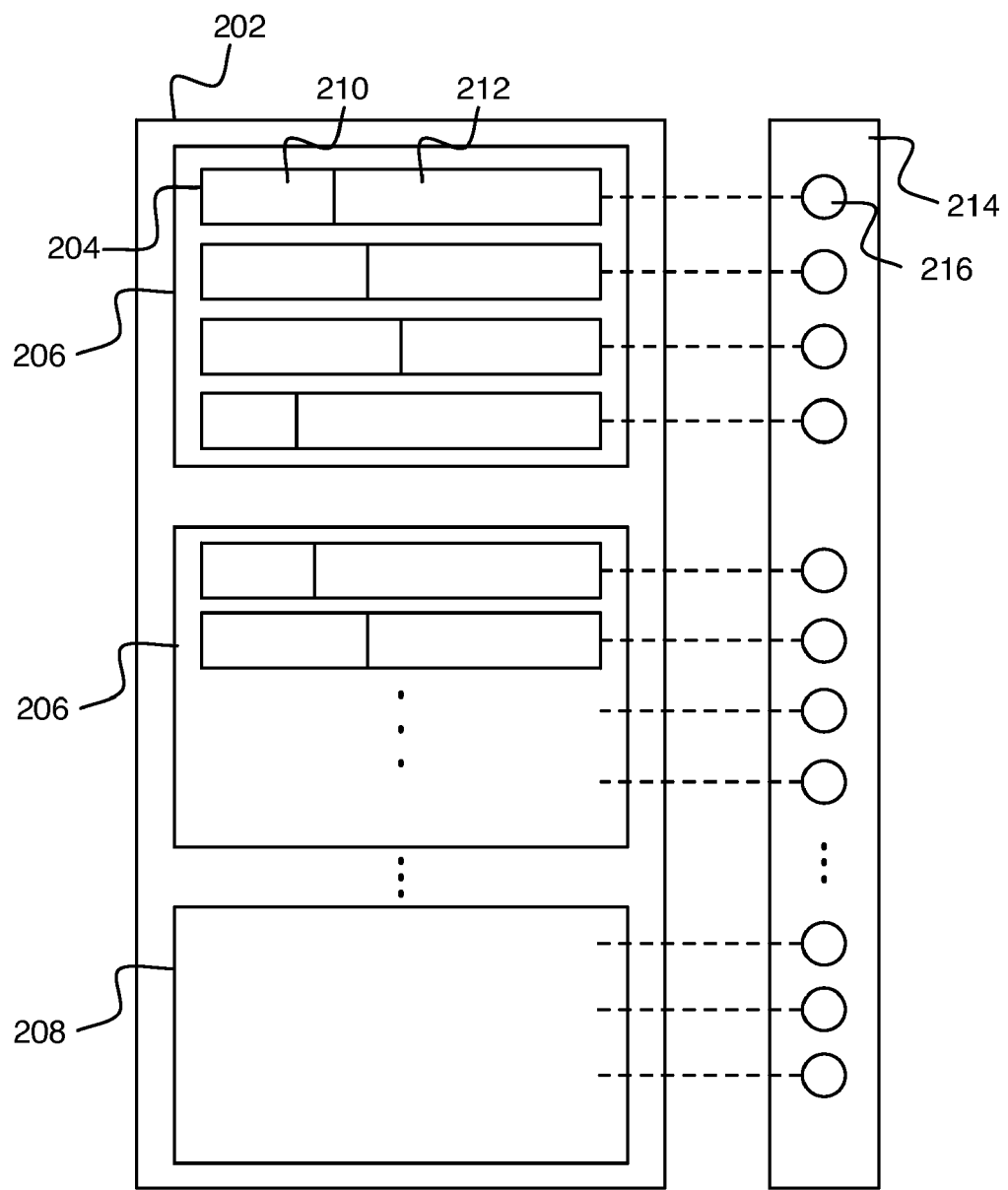
FIG. 2 is an illustration of an example flash memory.

FIG. 2 is an illustration of an example flash memory 100 that is arranged in accordance with at least some embodiments of the present disclosure. Flash memory 100 may include a main storage 202. Main storage 202 may include a plurality of entries 204 (this may also be referred to herein as entry storage locations) distributed among a plurality of erase units 206. Each of the entries 204 may include a key field 210 and/or a value field 212 configured to store key/value pairs.

Flash memory 100 may include a persistent tag vector storage 214 (this may also be referred to herein as obsolescence data). Persistent tag vector storage 214 may be configured to store a plurality of persistent tags 216. In various examples, a persistent tag vector of persistent tags 216 may be implemented as hardware associated with flash memory 100 (e.g. persistent tag vector storage 214), as firmware, as software associated with flash memory 100, or as some combination of hardware, firmware or software. One implementation of persistent tags 216 may use the first bit associated with an entry 204 in main storage 202 to indicate whether that entry is obsolete. Such a design may include that bit being written independently from the entry or that bit being written twice. However, the underlying flash memory 100 (see FIG. 1) might not support either behavior when such a bit is contiguous with the entry. Therefore, an abstraction of persistent tags 216 may be implemented in various ways to be non-contiguous with the entry. In the processes describe below in FIGS. 3-6, persistent tags 216 may be denoted as "entry.obsolete", which may be stored independent of the location/implementation of such persistent tags 216.

Individual persistent tags 216 may be associated with corresponding individual entries 204. Persistent tags 216 may be utilized to identify obsolete entries 204 in the flash memory 100. Persistent tags 216 may be bit sized (as may be referred to herein as a persistent bit vector) or may be larger than bit sized (as may be referred to herein as a persistent tag vector). Individual persistent tags 216 larger than a bit may be utilized to designate arbitrary states, such as type information or versioning associated with an entity in the flash memory 100. Additionally or alternatively, a vector of persistent tags 216 may or may not span the entire flash memory 100. Instead, such a vector of persistent tags 216 may be utilized for tagging larger entities.

Persistent tags 216, by their nature, may be overwritten frequently, so the main storage 202 may not be appropriate for persistent tag 216. Similarly, a classical FTL 108 (see FIG. 1) may be inefficient for persistent tag 216 implementation. Instead, an alternate firmware/hardware facility may be used, as illustrated in the example of FIG. 2. In various examples, a persistent tag vector of persistent tags 216 may be implemented as hardware associated with flash memory 100 (e.g. persistent tag vector storage 214), as firmware, as software associated with flash memory 100, or as some combination of hardware, firmware or software.

Recovery from corrupted data from main storage 202 and/or persistent tag vector storage 214 may not be possible without additional stored state information. Therefore, writes of all states—both persistent tag 216 states and entry 204 states—may either be atomic (e.g. combined so as to appear a single operation, transaction, or action), or additional information may be stored to allow recovery from an inconsistent state.

FIG. 2 is an illustrative schematic of flash memory 100 and does not illustrate physical location of the components illustrated therein. It is appreciated that the flash memory 100 described herein is illustrative and that examples and modifications are possible. Design choices may be related to, for example, considerations of hardware size and complexity versus performance, thermal energy and heat dissipation, overall throughput, etc.

Figure 3:
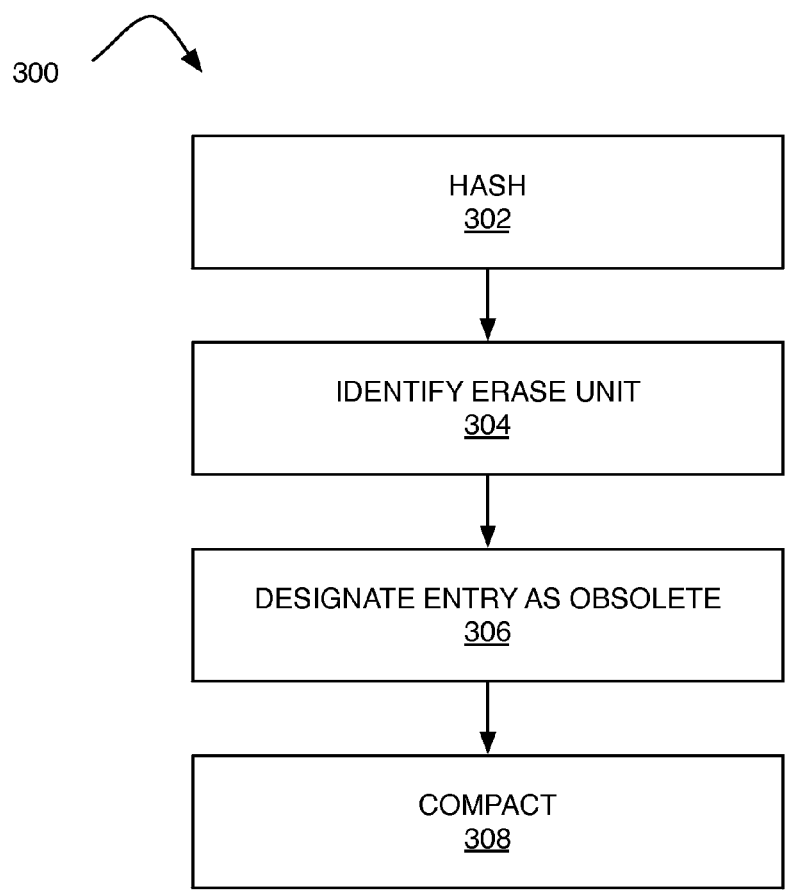
FIG. 3 is an illustration of an example process for operation of a flash memory configured to implement hash table procedures.

FIG. 3 is an illustration of an example process 300 for operation of a flash memory configured to implement hash table procedures that is arranged in accordance with at least some embodiments of the present disclosure. In the illustrated example, process 300, and other processes described herein, set forth various functional blocks or actions that may be described as processing steps, functional operations, events and/or acts, etc., which may be performed by hardware, software, and/or firmware. Those skilled in the art in light of the present disclosure will recognize that numerous alternatives to the functional blocks shown in FIG. 3 may be practiced in various implementations. For example, although process 300, as shown in FIG. 3, comprises one particular order of blocks or actions, the order in which these blocks or actions are presented does not necessarily limit claimed subject matter to any particular order. Likewise, intervening actions not shown in FIG. 3 and/or additional actions not shown in FIG. 3 may be employed and/or some of the actions shown in FIG. 3 may be eliminated, without departing from the scope of claimed subject matter. Process 300 may include one or more of operations as illustrated by blocks 302, 304, 306, and/or 308.

As illustrated, process 300 may be implemented for operation of a flash memory to associate an input value with an input key and/or store an input key/value pair. Processing may begin at operation 302, "hash", where an input key hash value may be determined. For example, the input key hash value may be determined by hashing the input key with a hash function.

Processing may continue from operation 302 to operation 304, "identify erase unit", where a write erase unit may be identified to be considered for being written to. For example, the write erase unit may be identified based at least in part on the input key hash value and the number of erase units in the flash memory. In one example, the write erase unit may be identified based at least in part on a modulo operation on the input key hash value and the number of erase units in the flash memory.

Processing may continue from operation 304 to operation 306, "designate entry as obsolete", where one or more entries may be designated as including an obsolete value. For example, an entry may be designated as including an obsolete value when a stored key/value pair in the entry includes a stored key that corresponds to the input key and includes a stored value that does not correspond to the input value.

Processing may continue from operation 306 to operation 308, "compact", where the write erase unit may be compacted. For example, the write erase unit may be compacted when the erase unit to be written to is full.

Process 300 may include intervening actions not shown in FIG. 3 and/or additional actions not shown in FIG. 3, and/or may eliminate some of the actions shown in FIG. 3, without departing from the scope of claimed subject matter. For example, FIGS. 4-6 may illustrate actions that may be in addition to or alternative to those actions described in FIG. 3, as will be discussed in greater detail below.

Figure 4:
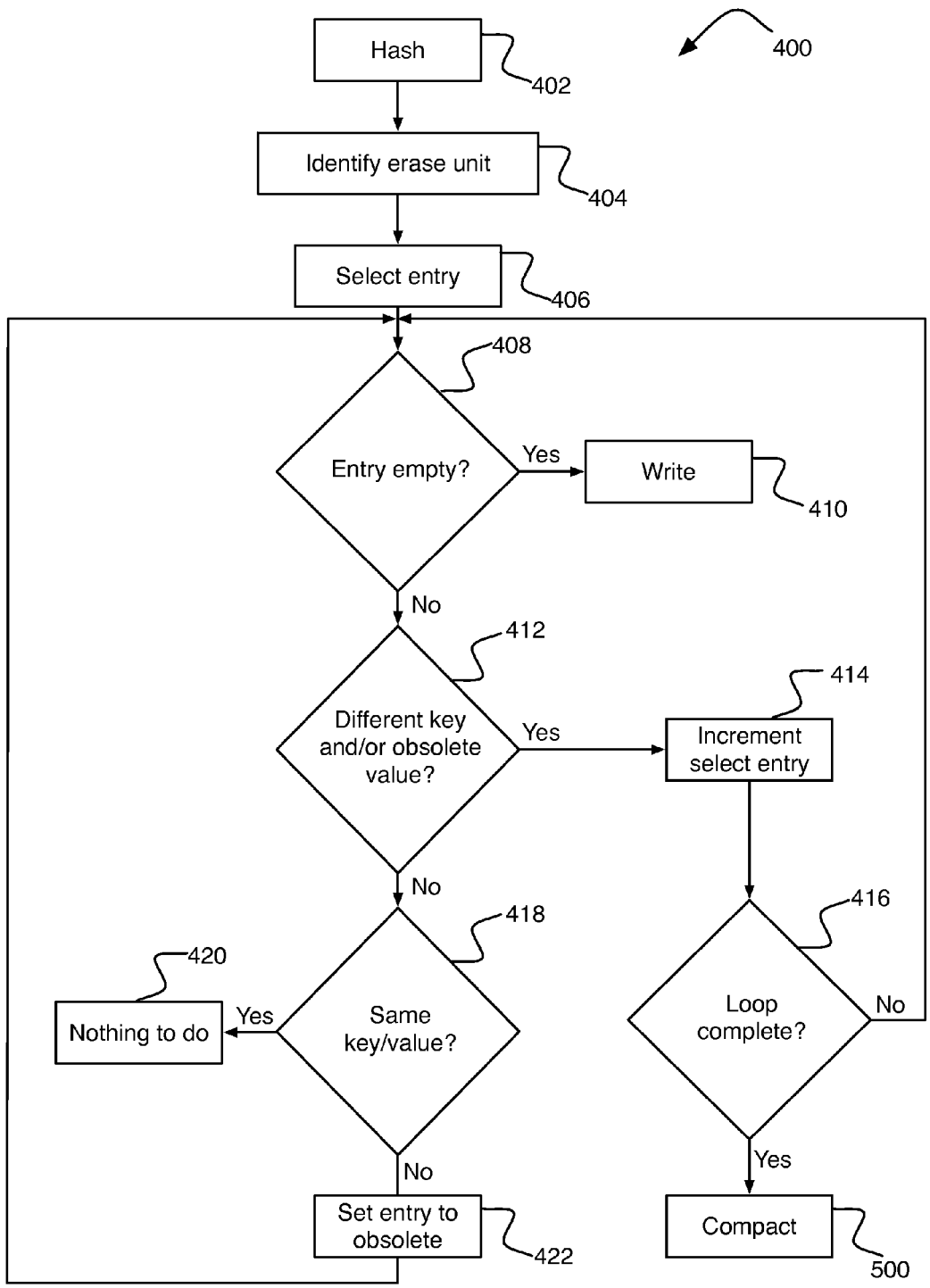
FIG. 4 is an illustration of an example process for operation of a flash memory configured to implement hash table procedures.

FIG. 4 is an illustration of an example process 400 for operation of a flash memory configured to implement hash table procedures that is arranged in accordance with at least some embodiments of the present disclosure. In the illustrated example, process 400, and other processes described herein, set forth various functional blocks or actions that may be described as processing steps, functional operations, events and/or acts, etc., which may be performed by hardware, software, and/or firmware. Those skilled in the art in light of the present disclosure will recognize that numerous alternatives to the functional blocks shown in FIG. 4 may be practiced in various implementations. For example, although process 400, as shown in FIG. 4, comprises one particular order of blocks or actions, the order in which these blocks or actions are presented does not necessarily limit claimed subject matter to any particular order. Likewise, intervening actions not shown in FIG. 4 and/or additional actions not shown in FIG. 4 may be employed and/or some of the actions shown in FIG. 4 may be eliminated, without departing from the scope of claimed subject matter. Process 400 may include one or more of operations as illustrated by blocks 402, 404, 406, 408, 410, 412, 414, 416, 418, 420, and/or 422.

As illustrated, process 400 may be implemented for operation of a flash memory to associate an input value with an input key and/or store an input key/value pair. Processing may begin at operation 402, "hash", where an input key hash value may be determined. For example, the input key hash value may be determined by hashing the input key with a hash function.

Processing may continue from operation 402 to operation 404, "identify erase unit", where a write erase unit may be identified to be considered for being written to. For example, the write erase unit may be identified based at least in part on the input key hash value and the number of erase units in the flash memory. In one example, the write erase unit may be identified based at least in part on a modulo operation on the input key hash value and the number of erase units in the flash memory.

Processing may continue from operation 404 to operation 406, "select entry", where a select entry may be considered for being written to. For example, the select entry may be selected based at least in part on the hash value and the number of entries in the write erase unit. In one example, the select entry may be selected based at least in part on a modulo operation on the hash value and the number of entries in the write erase unit.

Processing may continue from operation 406 to operation 408, "entry empty?", where a select entry may be evaluated to determine whether the select entry is empty (e.g. the entry has no stored data). In cases where the select entry is determined to be empty, processing may continue from operation 408 to operation 410, "write", where the key/value pair can be written to the empty select entry. Otherwise processing may continue from operation 408 to operation 412 when the select entry is determined to be non-empty.

At operation 412, "different key and/or obsolete value?", a determination may be made whether a stored key/value pair in the select entry includes a stored key that does not correspond to the input key and/or includes a stored value that is obsolete. In cases where the stored key/value pair in the select entry includes a stored key that does not correspond to the input key and/or includes a stored value that is obsolete, processing may continue from operation 412 to operation 414, "increment select entry", where the select entry may be incremented so as to iterate through one or more subsequent select entries. Otherwise, processing may continue from operation 412 to operation 418 when the select entry includes a stored key that correspond to the input key and includes a stored value that is not obsolete.

Processing may continue from operation 414 to operation 416, "loop complete?", where a determination may be made whether each of the entries in the write erase unit have been iterated through and considered. In cases where each of the entries in the write erase unit have not been iterated through and considered, process 400 may proceed back to operation 408. In cases where each of the entries in the write erase unit have been iterated through and considered, process 400 may proceed from operation 416 to process 500, "compact", where the write erase unit may be compacted as will be described in connection with FIG. 5. For example, the write erase unit may be compacted when all entries in the write erase unit have been iterated through and where all of the entries are determined to include stored keys that do not correspond to the input key and/or include stored values that are obsolete.

At operation 418, "same key/value?", a determination may be made whether a stored key/value pair in the select entry includes a stored key that corresponds to the input key and includes a stored value that corresponds to the input value. In cases where the stored key/value pair in the select entry includes a stored key that corresponds to the input key and includes a stored value that corresponds to the input value, processing may continue from operation 418 to operation 420, "nothing to do", where process 400 may indicate that there is no writing to storage or compacting that needs to occur. For example, there may be no writing to storage or compacting that needs to occur, as the write erase unit has been determined to already include a stored key/value pair that matches the input key/value pair. Otherwise processing may continue from operation 418 to operation 422 when the stored key/value pair in the select entry does not include a stored value that is corresponds to the input value.

At operation 422, "set entry to obsolete", the select entry may be designated as including an obsolete value. For example, the select entry may be designated as including an obsolete value when a stored key/value pair in the select entry includes a stored key that corresponds to the input key and includes a stored value that does not correspond to the input value. Operations 408, 412, and 418 may operate together to determine whether a stored key/value pair in the select entry includes a stored key that corresponds to the input key and includes a stored value that does not correspond to the input value. For example, operations 408, 412, and 418 may be utilized collectively to eliminate empty entries, entries with different keys, entries previously designated as obsolete, and entries that duplicate the input key/value pair to determine whether a stored key/value pair in the select entry includes a stored key that corresponds to the input key and includes a stored value that does not correspond to the input value. Alternatively or additionally, an operation to determination that the select entry is obsolete may be performed by process 400. Process 400 may proceed back to operation 408 after operation 422.

One example of process 400 may also be illustrated by the instructions below. These instructions are illustrative and may not include all the details of process 400. Please note that the instructions below illustrate a first module, "hash table.put", configured to associate a value v with a key k, and a second module, "puteu" configured to put a key/value pair k,v in erase unit u.

```
Hash table.put(k,v):
    hash(k) → h
    eu = h mod numOfEraseUnits
    puteu(k,v,eu,h)
puteu(k,v,eu,h):
    entry = a = eu.[h mod entriesPerEraseUnit]
    scan:
    if (entry.empty) then return write(entry, k v)
    if (entry.key != k || entry.obsolete) then
        entry = entry++ mod entriesPerEraseUnit
        if (entry == a) then return compact(k, v)
        goto scan
    if (entry.key == k && entry.val == v) then return; /* Nothing to do. */
    set entry.obsolete
    goto scan
```

In operation, wear leveling may be a byproduct of the hash function, which should be chosen accordingly. Since the process 400 provides wear leveling through the hash function and does not rely on a block oriented design for storage (beyond the use of erase units), the process 400 may not require the corresponding functionality from FTL 108 (see FIG. 1) and/or file system 106 (see FIG. 1).

Figure 5:
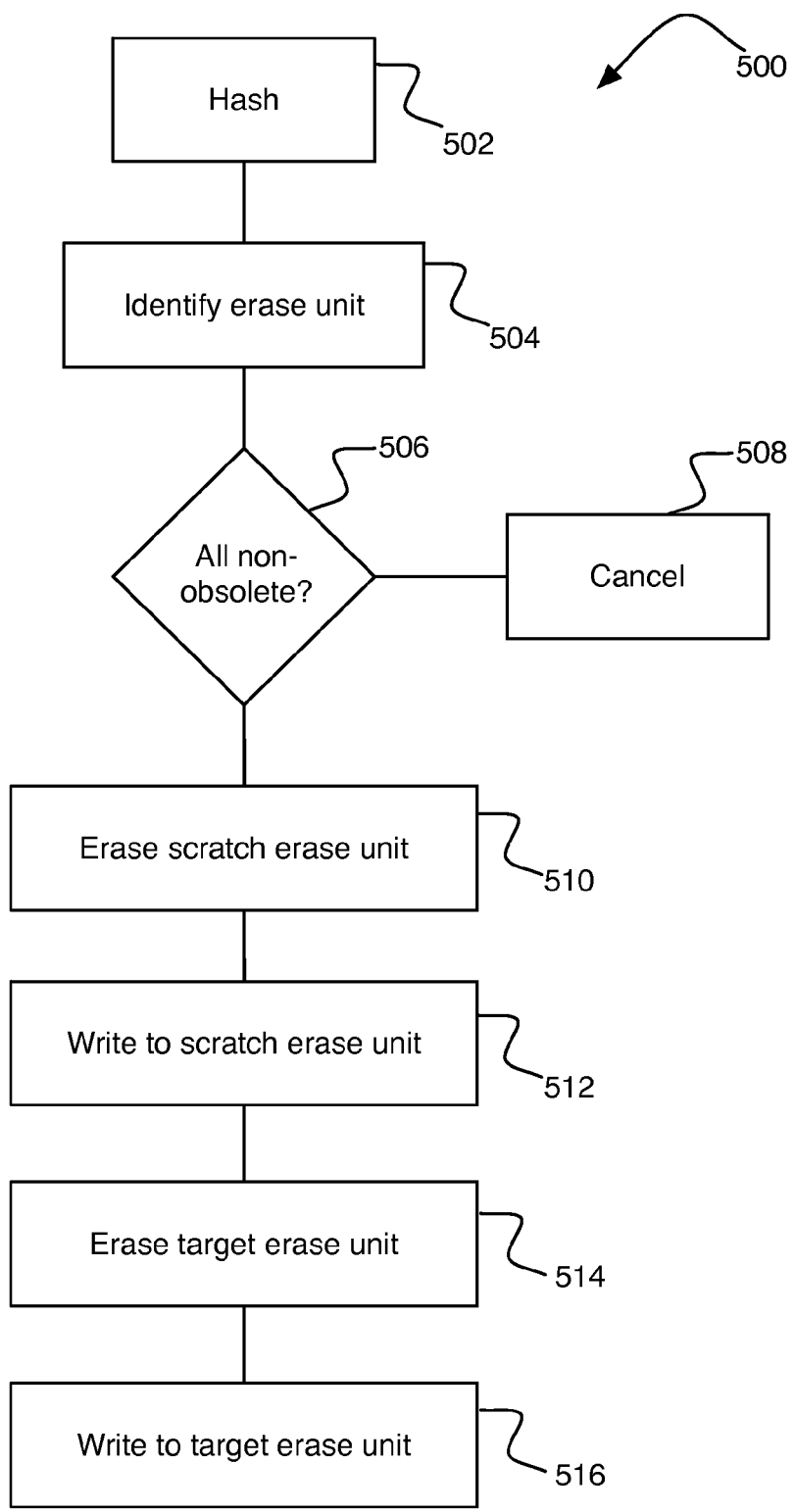
FIG. 5 is an illustration of an example process for operation of a flash memory configured to implement hash table procedures.

FIG. 5 is an illustration of an example process 500 for operation of a flash memory configured to implement hash table procedures that is arranged in accordance with at least some embodiments of the present disclosure. In the illustrated example, process 500, and other processes described herein, set forth various functional blocks or actions that may be described as processing steps, functional operations, events and/or acts, etc., which may be performed by hardware, software, and/or firmware. Those skilled in the art in light of the present disclosure will recognize that numerous alternatives to the functional blocks shown in FIG. 5 may be practiced in various implementations. For example, although process 500, as shown in FIG. 5, comprises one particular order of blocks or actions, the order in which these blocks or actions are presented does not necessarily limit claimed subject matter to any particular order. Likewise, intervening actions not shown in FIG. 5 and/or additional actions not shown in FIG. 5 may be employed and/or some of the actions shown in FIG. 5 may be eliminated, without departing from the scope of claimed subject matter. Process 500 may include one or more of operations as illustrated by blocks 502, 504, 506, 508, 510, 512, 514, 516, and/or 518.

As illustrated, process 500 may be implemented for operation of a flash memory to compact an erase unit. Processing may begin at operation 502, "hash", where an input key hash value may be determined. For example, the input key hash value may be determined by hashing the input key with a hash function.

Processing may continue from operation 502 to operation 504, "identify target erase unit", where a target erase unit may be identified to be compacted. For example, the target erase unit may be identified based at least in part on the input key hash value and a number of erase units in the flash memory. In one example, the target erase unit may be identified based at least in part on a modulo operation on the input key hash value and the number of erase units in the flash memory. In some embodiments, operations 502 and/or 504 may not be repeated if corresponding operations 402 and/or 404 (see FIG. 4) have already been performed.

Processing may continue from operation 504 to operation 506, "all non-obsolete?", where a determination may be made whether the targeted erase unit is full of non-obsolete entries. In cases where the targeted erase unit is determined to be full of non-obsolete entries, processing may continue from operation 506 to operation 508, "cancel", where the compacting may be cancelled. For example, operation may return an error message that the target erase unit is full of non-obsolete entries.

In cases where the targeted erase unit is determined to be not full, processing may continue from operation 506 to operation 510, "erase scratch erase unit", where a scratch erase unit may be erased from the flash memory. For example, such a scratch erase unit may be an erase unit designated for temporary data storage for use in trash collection.

Processing may continue from operation 510 to operation 512, "write to scratch erase unit", where non-obsolete entries may be written from the targeted erase unit to the scratch erase unit in the flash memory.

Processing may continue from operation 512 to operation 514, "erase target erase unit", where the target erase unit may be erased from the flash memory.

Processing may continue from operation 514 to operation 516, "write to target erase unit", where non-obsolete entries may be written from the scratch erase unit to the target erase unit in the flash memory. The target erase unit may now have been re-written to remove obsolete entries to free up entries to store new input key/value pairs.

One example of process 500 may also be illustrated by the instructions below. These instructions are illustrative and may not include all the details of process 500. Please note that the instructions below illustrate a module, "compact", configured to rewrite a target erase unit only with non-obsolete entries.

```
compact(k,v): Take out the garbage: rewrite the EU with current data
only.
    hash(k) → h
    eu = h mod numOfEraseUnits
    if none obsolete in eu then return ERROR /* Full */
    erase scratchEraseUnit
    puteu(k,v, scratchEraseUnit, h)
    for each non-obsolete (k,v) in eu, puteu(k, v, scratchEraseUnit)
    erase(eu)
    for each (k,v) in scratchEraseUnit, putdu(k, v, eu)
```

In operation, process 500 may be triggered by process 400 when an erase unit contains too much garbage (e.g. obsolete entries). Process 500 collects such garbage by copying non-obsolete entries to a scratch erase unit, erasing the target erase unit, and then putting the non-obsolete entries from the scratch erase unit into the target erase unit.

Figure 6:
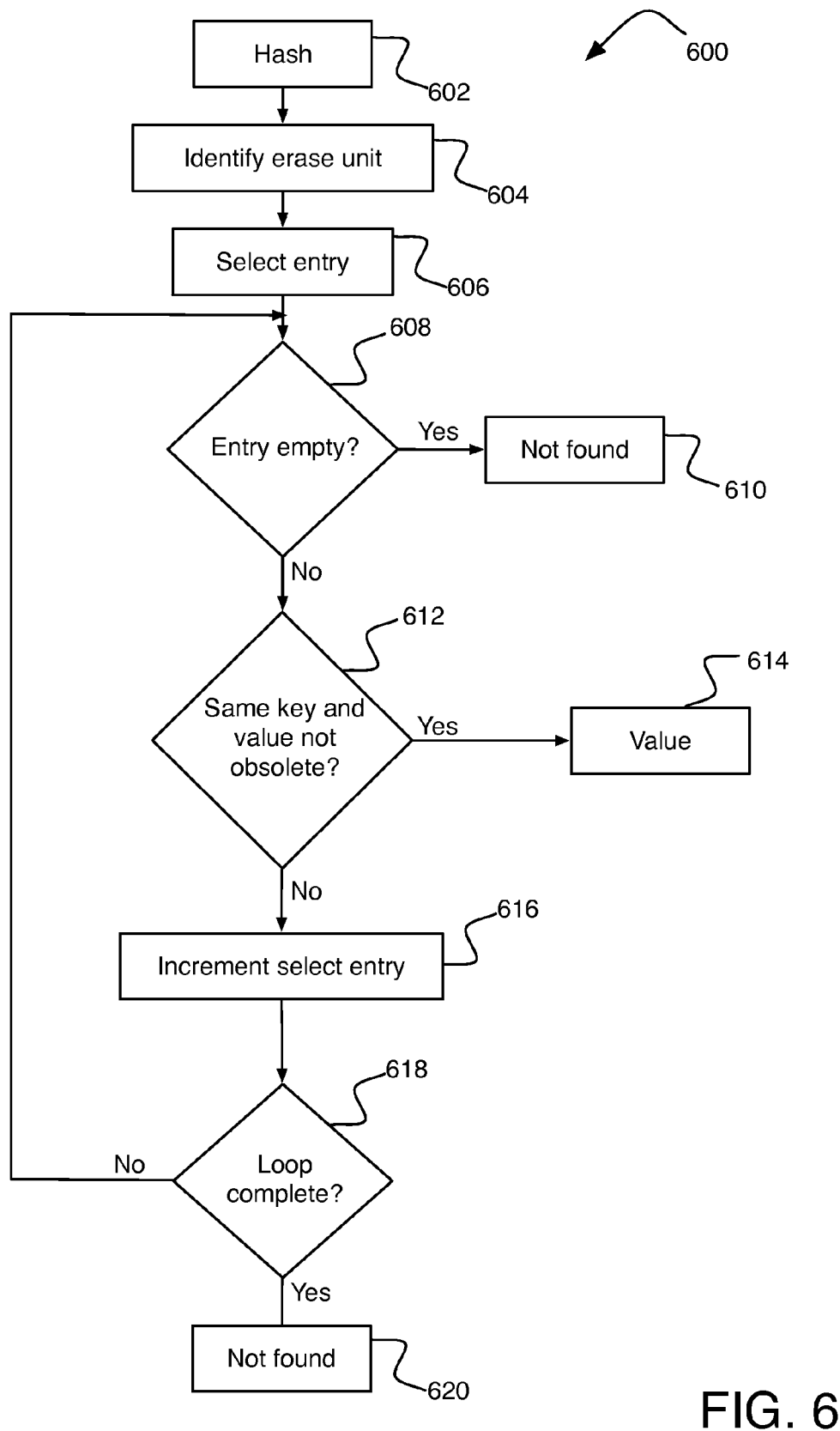
FIG. 6 is an illustration of an example process for operation of a flash memory configured to implement hash table procedures.

FIG. 6 is an illustration of an example process 600 for operation of a flash memory configured to implement hash table procedures that is arranged in accordance with at least some embodiments of the present disclosure. In the illustrated example, process 600, and other processes described herein, set forth various functional blocks or actions that may be described as processing steps, functional operations, events and/or acts, etc., which may be performed by hardware, software, and/or firmware. Those skilled in the art in light of the present disclosure will recognize that numerous alternatives to the functional blocks shown in FIG. 6 may be practiced in various implementations. For example, although process 600, as shown in FIG. 6, comprises one particular order of blocks or actions, the order in which these blocks or actions are presented does not necessarily limit claimed subject matter to any particular order. Likewise, intervening actions not shown in FIG. 6 and/or additional actions not shown in FIG. 6 may be employed and/or some of the actions shown in FIG. 6 may be eliminated, without departing from the scope of claimed subject matter. Process 600 may include one or more of operations as illustrated by blocks 602, 604, 606, 608, 610, 612, 614, 616, 618, and/or 620.

As illustrated, process 600 may be implemented for operation of a flash memory to retrieve a non-obsolete value associated with a specific key. Processing may begin at operation 602, "hash", where an input key hash value may be determined. For example, the input key hash value may be determined by hashing the input key with a hash function.

Processing may continue from operation 602 to operation 604, "identify erase unit", where a search erase unit may be identified to be subject to a search. For example, the search erase unit may be identified based at least in part on the input key hash value and the number of erase units in the flash memory. In one example, the search erase unit may be identified based at least in part on a modulo operation on the input key hash value and the number of erase units in the flash memory.

Processing may continue from operation 604 to operation 606, "select entry", where a select entry may be considered for being searched. For example, the select entry may be selected based at least in part on the hash value and the number of entries in the write erase unit. In one example, the select entry may be selected based at least in part on a modulo operation on the hash value and the number of entries in the search erase unit.

Processing may continue from operation 606 to operation 608, "entry empty?", where a determination may be made whether the select entry is empty. In cases where the select entry is empty, processing may continue from operation 608 to operation 610, "not found", where process 600 may end and where a message that the value could not be found may be returned. Otherwise, processing may continue from operation 608 to operation 612 when process 600 determines that a selected entry is not empty.

At operation 612, "same key and value not obsolete?", a determination may be made whether a non-obsolete key/value pair in the select entry corresponds to the specific key. For example, a determination may be made whether a stored key/value pair in the select entry includes a stored key that corresponds to the specific key and includes a stored value that is non-obsolete. In cases where the non-obsolete key/value pair in the select entry corresponds to the specific key, processing may continue from operation 612 to operation 614, "value", where process 600 may end and where the non-obsolete value associated with the specific key may be retrieved.

In cases where a non-obsolete key/value pair in the select entry does not correspond to the specific key, processing may continue from operation 612 to operation 616, "increment select entry", where the select entry may be incremented so as to iterate through one or more subsequent select entries.

Processing may continue from operation 616 to operation 618, "loop complete?", where a determination may be made whether each of the entries in the search erase unit have been iterated through and considered. In cases where each of the entries in the search erase unit have not been iterated through and considered, process 600 may proceed back to operation 608. In cases where each of the entries in the write erase unit have been iterated through and considered, process 600 may proceed from operation 618 to operation 620, "not found", where process 600 may end and where a message that the value could not be found may be returned.

One example of process 600 may also be illustrated by the instructions below. These instructions are illustrative and may not include all the details of process 600. Please note that the instructions below illustrate a module, "hash table.get", configured to retrieve the value, if any, associated with a key k.

```
Hash table.get(k): Get the value, if any, associated with key k.
    hash(k) → h
    eu = h mod numOfEraseUnits
    entry = a = eu.[h mod entriesPerEraseUnit]
    check:
    if (entry.empty) then return NOT_FOUND
    if (entry.key == k && !entry.obsolete) then return entry.val
    entry = entry++ mod entriesPerEraseUnit
    if (entry == a) then return NOT_FOUND /* Looped */
    goto check
```

For simplicity, procedures 300, 400, 500, and 600 have been illustrated with examples where the keys and values are of fixed sizes. However, procedure 300, 400, 500, and 600 may be applicable to examples where the keys and values are of variable sizes. Similarly, procedures 300, 400, 500, and 600 have been illustrated with examples where the hash table is of fixed size. However, procedure 300, 400, 500, and 600 may be applicable to examples where the hash table is of variable size, and accordingly, the claimed subject matter is not limited in these respects.

FIG. 7 illustrates an example computer program product 700 that is arranged in accordance with at least some embodiments of the present disclosure. Computer program product 700 may include a signal bearing medium 702. Signal bearing medium 702 may include one or more machine-readable instructions 704, which, when executed by one or more processors, may operatively enable a computing device to provide the functionality described above with respect to FIG. 1, FIG. 2 FIG. 3, FIG. 4, FIG. 5, and/or FIG. 6. Thus, for example, referring to the system of FIG. 1, flash memory 100 may undertake one or more of the actions shown in FIG. 2, FIG. 3, FIG. 4, FIG. 5, and/or FIG. 6 in response to instructions 704 conveyed by medium 702.

In some implementations, signal bearing medium 702 may encompass a computer-readable medium 706, such as, but not limited to, a hard disk drive, a Compact Disc (CD), a Digital Video Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communication link, a wireless communication link, etc.).

Figure 8:
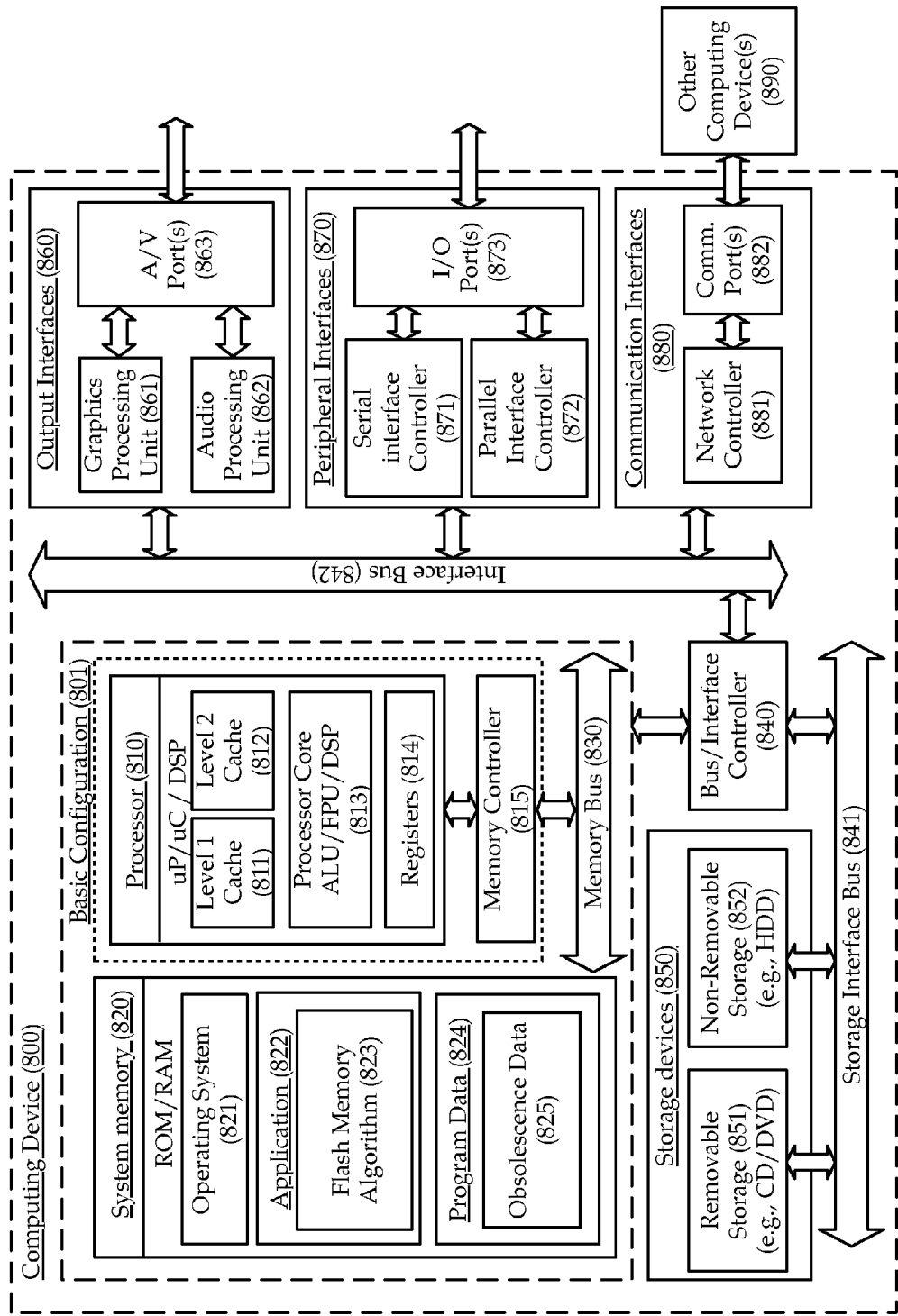
FIG. 8 is a block diagram illustrating an example computing device, all arranged in accordance with at least some embodiments of the present disclosure.

FIG. 8 is a block diagram illustrating an example computing device 800 that is arranged in accordance with at least some embodiments of the present disclosure. In one example basic configuration 801, computing device 800 may include one or more processors 810 and system memory 820. A memory bus 830 can be used for communicating between the processor 810 and the system memory 820.

Depending on the desired configuration, processor 810 may be of any type including but not limited to a microprocessor (μP), a microcontroller (μC), a digital signal processor (DSP), or any combination thereof. Processor 810 can include one or more levels of caching, such as a level one cache 811 and a level two cache 812, a processor core 813, and registers 814. The processor core 813 can include an arithmetic logic unit (ALU), a floating point unit (FPU), a digital signal processing core (DSP Core), or any combination thereof. A memory controller 815 can also be used with the processor 810, or in some implementations the memory controller 815 can be an internal part of the processor 810.

Depending on the desired configuration, the system memory 820 may be of any type including but not limited to volatile memory (such as RAM), non-volatile memory (such as ROM, flash memory, etc.) or any combination thereof. System memory 820 may include an operating system 821, one or more applications 822, and program data 824. Application 822 may include flash memory algorithm 823 that can be arranged to perform the functions, actions, and/or operations as described herein including the functional blocks, actions, and/or operations described with respect to process 200 of FIG. 2, process 300 of FIG. 3, process 400 of FIG. 4, process 500 of FIG. 5, and/or process 600 of FIG. 6. Program Data 824 may include obsolescence data 825 for use with the flash memory algorithm 823. In some example embodiments, application 822 may be arranged to operate with program data 824 on an operating system 821 such that implementations of hash tables for flash memory may be provided as described herein. This described basic configuration is illustrated in FIG. 8 by those components within dashed line 801.

Computing device 800 may have additional features or functionality, and additional interfaces to facilitate communications between the basic configuration 801 and any required devices and interfaces. For example, a bus/interface controller 840 may be used to facilitate communications between the basic configuration 801 and one or more data storage devices 850 via a storage interface bus 841. The data storage devices 850 may be removable storage devices 851, non-removable storage devices 852, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 820, removable storage 851 and non-removable storage 852 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of device 800.

Computing device 800 may also include an interface bus 842 for facilitating communication from various interface devices (e.g., output interfaces, peripheral interfaces, and communication interfaces) to the basic configuration 801 via the bus/interface controller 840. Example output interfaces 860 may include a graphics processing unit 861 and an audio processing unit 862, which may be configured to communicate to various external devices such as a display or speakers via one or more A/V ports 863. Example peripheral interfaces 870 may include a serial interface controller 871 or a parallel interface controller 872, which may be configured to communicate with external devices such as input devices (e.g., keyboard, mouse, pen, voice input device, touch input device, etc.) or other peripheral devices (e.g., printer, scanner, etc.) via one or more I/O ports 873. An example communication interface 880 includes a network controller 881, which may be arranged to facilitate communications with one or more other computing devices 890 over a network communication via one or more communication ports 882. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 800 may also be implemented as a personal computer including both laptop computer and non-laptop computer configurations. In addition, computing device 800 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link, a wireless communication link, etc.).

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method for managing erase units in a flash memory via a hash table, comprising:
   determining an input key hash value by hashing an input key of an input key/value pair, wherein the input key/value pair includes an input key and an input value;
   identifying a write erase unit of the flash memory based at least in part on the determined input key hash value;
   designating one or more entries in the identified write erase unit with an obsolete value when stored key/value pairs in the entries include a stored key that corresponds to the input key and includes a stored value that does not correspond to the input value; and
   compacting the write erase unit when the identified write erase unit is determined to be full, wherein the compacting of the write erase unit is based at least in part on the designated obsolete value.

2. The method of claim 1, wherein identifying the write erase unit further based at least in part on a number of erase units in the flash memory.

3. The method of claim 1, wherein designating one or more entries in the identified write erase unit as including the obsolete value comprises designating one or more entries in the write erase unit with an obsolete value via a persistent tag vector storage storing a plurality of individual persistent tags associated with corresponding individual entries.

4. The method of claim 3, wherein the persistent tag vector is a persistent bit vector.

5. The method of claim 3, wherein designating one or more entries in the identified write erase unit with the obsolete value comprises:
- determining a select entry to be written to based at least in part on the hash value and a number of entries in the write erase unit;
- determining whether the select entry is empty, wherein the key/value pair is written to the select entry when determined to be empty;
- determining, for the stored key/value pair in the select entry, whether the stored key does not correspond to the input key and/or the stored value is obsolete; and
- determining, for the stored key/value pair in the select entry, whether the stored key corresponds to the input key and the stored value corresponds to the input value.

6. The method of claim 1, wherein compacting the write erase unit further comprises: compacting the write erase unit when all entries in the write erase unit have been iterated through and where all of the entries are determined to include stored keys that do not correspond to the input key and/or include stored values that are determined to be obsolete.

7. The method of claim 1, wherein compacting the write erase unit further comprises: canceling the compacting based at least in part on a determination of whether the write erase unit is full of non-obsolete entries.

8. The method of claim 1, wherein compacting the write erase unit further comprises:
- erasing a scratch erase unit;
- writing non-obsolete entries from the targeted erase unit to the scratch erase unit following erasure of the scratch erase unit;
- erasing the target erase unit following the writing of non-obsolete entries to the scratch erase unit; and
- writing non-obsolete entries from the scratch erase unit to the targeted erase unit following the erasure of the target erase unit.

9. The method of claim 1, further comprising retrieving a non-obsolete value associated with a specific key, wherein the retrieving of the non-obsolete value is based at least in part on the designated obsolete value.

10. The method of claim 9, wherein retrieving the non-obsolete value associated with the specific key, comprises:
- determining a specific key hash value by hashing the specific key;
- identifying a search erase unit based at least in part on the specific key hash value and a number of erase units in the flash memory;
- determining a select entry to be searched based at least in part on the specific key hash value and a number of entries in the search erase unit;
- determining whether the select entry is empty;
- determining whether a non-obsolete key/value pair in the select entry corresponds to the specific key to retrieve the non-obsolete value associated with the specific key;
- incrementing the select entry to iterate through one or more subsequent select entries; and
- stopping the search for the non-obsolete value when all entries in the erase unit have been searched.

11. A flash memory, comprising:
- a main storage comprising a plurality of entry storage locations distributed among a plurality of erase units, wherein the entry storage locations are configured to store a plurality of entries; and
- a persistent tag vector storage comprising a plurality of persistent tag storage locations configured to store a plurality of persistent tags, wherein individual ones of the plurality of persistent tags are associated with corresponding individual ones of the plurality of entries, wherein the persistent tags are configured to identify obsolescence.

12. The flash memory of claim 11, wherein persistent tag vector is a persistent bit vector.

13. A computing device, comprising:
- a flash memory, the flash memory comprising:
  - a main storage comprising a plurality of entry storage locations distributed among a plurality of erase units, wherein the entry storage locations are configured to store a plurality of entries,
  - a persistent tag vector storage comprising a plurality of persistent tag storage locations configured to store a plurality of persistent tags, wherein individual ones of the plurality of persistent tags are associated with corresponding individual ones of the plurality of entries, wherein the persistent tags are configured to identify obsolescence; and
- a processor configured in communication with the flash memory.

14. The computing device of claim 13, wherein persistent tag vector is a persistent bit vector.

15. The computing device of claim 13, wherein the computing device is configured to:
- determine an input key hash value by hashing an input key of an input key/value pair, wherein the input key/value pair includes an input key and an input value;
- identify a write erase unit based at least in part on the determined input key hash value;
- designate one or more entries in the identified write erase unit with an obsolete value when stored key/value pairs in the entries include a stored key that corresponds to the input key and includes a stored value that does not correspond to the input value; and
- compact the write erase unit when the identified write erase unit to be written to is determined to be full, wherein the compaction of the write erase unit is based at least in part on the designated obsolete value.

16. The computing device of claim 15, wherein the designation of one or more entries in the write erase unit as including an obsolete value comprises the computing device being configured to designate one or more entries in the write erase unit as being obsolescent via the persistent tag vector storage.

17. The computing device of claim 15, wherein the compaction of the write erase unit further comprises the computing device being configured to compact the write erase unit when all entries in the write erase unit have been iterated through and where all of the entries are determined to include stored keys that do not correspond to the input key and/or include stored values that are obsolete.

18. The computing device of claim 13, wherein the compaction of the write erase unit further comprises the computing device being configured to:
- cancel the compacting based at least in part on a determination of whether the write erase unit is full of non-obsolete entries;
- erase a scratch erase unit;
- write non-obsolete entries from the targeted erase unit to the scratch erase unit following the erasure of the scratch erase unit;
- erase the target erase unit following the write of non-obsolete entries to the scratch erase unit; and
- write non-obsolete entries from the scratch erase unit to the targeted erase unit following the erasure of the target erase unit.

19. The computing device of claim 13, the computing device being further configured to retrieve a non-obsolete value associated with a specific key based at least in part on the designated obsolete value.

20. An article comprising:
a non-transitory signal bearing medium comprising machine-readable instructions stored thereon, which, if executed by one or more processors, operatively enable a computing device to:
determine an input key hash value by hashing an input key of an input key/value pair, wherein the input key/value pair includes an input key and an input value;
identify a write erase unit of a flash memory based at least in part on the determined input key hash value;
designate one or more entries in the identified write erase unit with an obsolete value when stored key/value pairs in the entries include a stored key that corresponds to the input key and includes a stored value that does not correspond to the input value; and
compact the write erase unit when the identified write erase unit to be written to is determined to be full, wherein the compaction of the write erase unit is based at least in part on the designated obsolete value.

21. The article of claim 20, further operatively enabling the computing device to:
designate one or more entries in the write erase unit as including an obsolete value via a persistent tag vector storage capable of storing a plurality of individual persistent tags associated with corresponding individual entries.

* * * * *

UNITED STATES PATENT AND TRADEMARK OFFICE
CERTIFICATE OF CORRECTION

| | |
|---|---|
| PATENT NO. | : 8,375,161 B2 |
| APPLICATION NO. | : 12/717034 |
| DATED | : February 12, 2013 |
| INVENTOR(S) | : Stephens |

Page 1 of 1

It is certified that error appears in the above-identified patent and that said Letters Patent is hereby corrected as shown below:

Title Page, item (56), under "Other Publications", in Column 2, Line 5, delete "al," and insert -- al., --.

Title Page, item (56), under "Other Publications", in Column 2, Line 9, delete "al," and insert -- al., --.

In the Drawings

Fig. 2, Sheet 2 of 8, delete Tag "208" and insert Tag -- 206 --.

Fig. 8, sheet 8 of 8, below "Processor (810)", Line 1, delete "uP / uC" and insert -- μP / μ/C --.

In the Specifications

Column 4, Line 48, delete "to is full" and insert -- to is determined to be full --.

Column 6, Line 23, delete "that is" and insert -- that --.

Column 7, Line 30, delete "514,516, and/or 518" and insert -- 514, and/or 516. --.

Signed and Sealed this
Seventeenth Day of December, 2013

Margaret A. Focarino
*Commissioner for Patents of the United States Patent and Trademark Office*